(12) United States Patent
Thanayankizil et al.

(10) Patent No.: US 9,955,493 B1
(45) Date of Patent: Apr. 24, 2018

(54) WIRELESS ACCESS POINT DETECTION AND USE BY A VEHICLE

(71) Applicant: GM GLOBAL TECHNOLOGY OPERATIONS LLC, Detroit, MI (US)

(72) Inventors: Lakshmi V. Thanayankizil, Rochester Hills, MI (US); Wen Gu, Novi, MI (US); Nadav Lavi, Herzliya Pituach (IL); Wahaj Ahmed, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/465,488

(22) Filed: Mar. 21, 2017

(51) Int. Cl.
| | |
|---|---|
| *H05K 11/02* | (2006.01) |
| *H04W 72/12* | (2009.01) |
| *H04W 48/16* | (2009.01) |
| *H04L 29/08* | (2006.01) |
| *H04W 4/00* | (2018.01) |
| *H04W 76/02* | (2009.01) |
| *B60R 16/023* | (2006.01) |
| *G06F 9/445* | (2018.01) |

(52) U.S. Cl.
CPC ..... *H04W 72/1205* (2013.01); *B60R 16/0231* (2013.01); *G06F 8/65* (2013.01); *H04L 67/12* (2013.01); *H04L 67/34* (2013.01); *H04W 4/008* (2013.01); *H04W 48/16* (2013.01); *H04W 76/02* (2013.01)

(58) Field of Classification Search
CPC .. H04W 84/12; Y04S 30/14; B60R 2300/806; B60R 11/0241; B60R 1/06; B60R 2011/004; B60R 2013/0287; B60R 25/10; H02J 7/0027; F02P 9/007
USPC ................................ 455/41.2, 99, 152.1, 345
See application file for complete search history.

(56) References Cited

U.S. PATENT DOCUMENTS

| | | | |
|---|---|---|---|
| 2017/0032589 A1* | 2/2017 | Zagajac | B60R 16/0232 |
| 2017/0064745 A1* | 3/2017 | Kephart, Jr. | H04W 76/02 |
| 2017/0129425 A1* | 5/2017 | Dalke | H04L 61/2015 |

* cited by examiner

*Primary Examiner* — Tu X Nguyen
(74) *Attorney, Agent, or Firm* — David Willoughby; Reising Ethington P.C.

(57) ABSTRACT

A system and method for carrying out wireless communications at a vehicle, wherein the vehicle comprises a wireless communications device and a plurality of vehicle system modules, wherein the method is carried out by the wireless communications device. The method can include the steps of: receiving an anticipatory vehicle ignition termination signal; setting the wireless communications device to operate in a station mode; detecting the presence of a wireless access point using the wireless communications device in the station mode; providing an indication to at least one of the vehicle system modules of the presence of the wireless access point; establishing a wireless connection between the wireless communications device and the wireless access point; and communicating data between the wireless access point and one or more vehicle system modules via the established wireless connection using the wireless communications device.

16 Claims, 2 Drawing Sheets

US 9,955,493 B1

WIRELESS ACCESS POINT DETECTION AND USE BY A VEHICLE

TECHNICAL FIELD

The disclosure relates to configuring a vehicle to carry out wireless data communications between a vehicle wireless communications device and a wireless access point.

BACKGROUND

Many electronic devices now carry out network communications. For example, many vehicles can transmit voice and data communications over both a short-range wireless network, such as Wi-Fi™, and a cellular network, such as GPRS or CDMA. Now, many vehicle components, devices, and modules desire to send to or receive data from a remote server, such as a vehicle backend service facility. Vehicles may desire to use a Wi-Fi™ connection to a router or modem that is connected to a land network instead of using cellular networking, which may be more costly or provide higher latency in some instances. Additionally, vehicles may desire to perform certain operations requiring remote data connectivity while the vehicle's ignition is off.

SUMMARY

According to an embodiment, there is provided a method of carrying out wireless communications at a vehicle, wherein the vehicle comprises a wireless communications device and a plurality of vehicle system modules, and wherein the method comprises the steps of: receiving an anticipatory vehicle ignition termination signal, wherein the anticipatory vehicle ignition termination signal indicates that an event associated with termination of a vehicle's ignition has occurred; setting the wireless communications device to operate in a station mode in response to receiving the anticipatory vehicle ignition termination signal; detecting the presence of a wireless access point using the wireless communications device in the station mode; providing an indication to at least one of the vehicle system modules of the presence of the wireless access point; establishing a wireless connection between the wireless communications device and the wireless access point; and communicating data between the wireless access point and one or more vehicle system modules via the established wireless connection using the wireless communications device.

According to another embodiment, there is provided a method of carrying out wireless communications at a vehicle, wherein the vehicle comprises a wireless communications device and a plurality of vehicle system modules, and wherein the method comprises the steps of: receiving an anticipatory termination signal at the wireless communications device or at least one of the vehicle system modules; determining at the wireless communications device the availability of a short-range wireless communication (SRWC) connection between the wireless communications device and a wireless access point; based on the receiving and determining steps, providing a notification to a predetermined vehicle system module in the vehicle to initiate a vehicle system update procedure when an ignition of the vehicle has been terminated; and subsequently, when the ignition of the vehicle is terminated and using the SRWC connection between the wireless communications device and the wireless access point, performing the vehicle system update procedure by installing at least one vehicle update to one or more of the plurality of vehicle system modules.

According to yet another embodiment, there is provided a vehicle communications system, comprising: a body control module; a wireless communications device, comprising: a short range wireless communications chipset; and a processor, wherein the processor is electronically coupled to the short range wireless communications chipset and the body control module, such that data may be communicated between the wireless communications device and a short range wireless communications (SRWC) device through the short range wireless communications chipset, wherein the SRWC device provides a hotspot enabling wireless data connections; wherein the body control module are configured to perform the following: anticipate a vehicle ignition termination; in response to anticipating the vehicle ignition termination, direct the wireless communications device to operate in a station mode; and when the wireless communications device detects the hotspot and the presence of data connectivity, wake up itself or wake up other vehicle system modules and, subsequently, carry out data communications over the hotspot via the SRWC device.

BRIEF DESCRIPTION OF THE DRAWINGS

Exemplary embodiments will hereinafter be described in conjunction with the appended drawings, wherein like designations denote like elements, and wherein.

DETAILED DESCRIPTION

Figure 1:
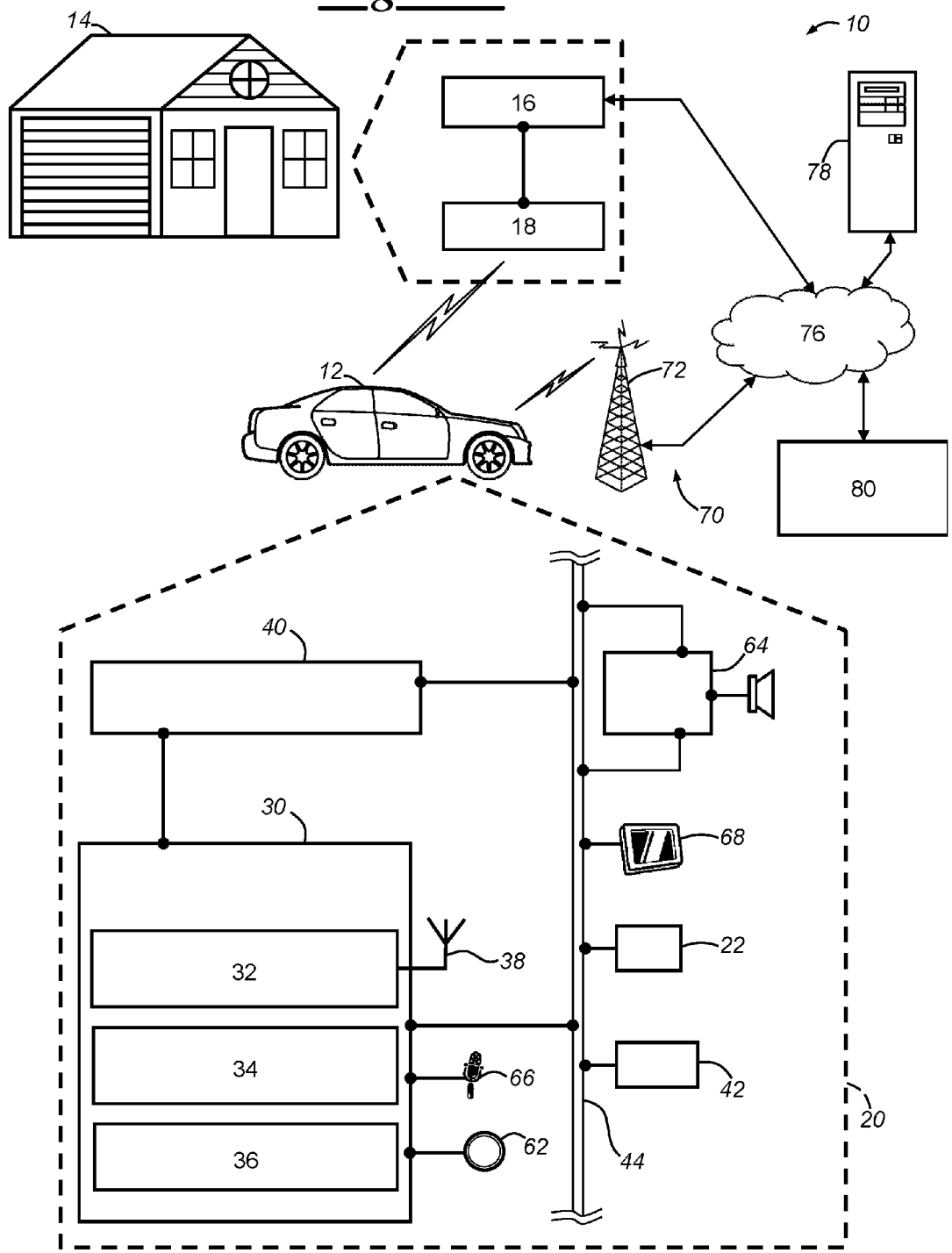
FIG. 1 is a block diagram depicting an embodiment of a communications system that is capable of utilizing the method disclosed herein.

The system and methods below enable vehicle wireless communications to be carried out when the vehicle's ignition is terminated or in an "off" state. For example, the vehicle may, upon realization that the vehicle's ignition may soon be terminated, set a wireless communications device included in the vehicle to operate in a station mode thereby permitting it to scan and/or connect to another wireless access point (WAP), such as a WAP located at a home residence. If a wireless access point is detected, the vehicle may operate one or more vehicle system modules to communicate data over a wireless connection between the wireless communications device and the wireless access point. Such operation of the vehicle and/or vehicle system modules may be carried out in accordance with an operating schedule. The data communications between the vehicle and the wireless access point may include the transfer of any data from the vehicle to a remote location or the transfer or download of data from a remote facility to the vehicle, such as the download of an over-the-air (OTA) update from a remote data facility. In such an example, upon a successful download of the update, the OTA update may then be installed to the appropriate vehicle module.

In an exemplary embodiment, the method begins by receiving an anticipatory vehicle ignition termination signal. As used herein, an anticipatory vehicle ignition termination signal is any signal that may be received by or realized by the vehicle that is indicative of a present or imminent termination of the vehicle's ignition (e.g., switch the electric motor or internal combustion engine or powertrain from ON to OFF). In one example, the vehicle ignition termination signal may be the result of the vehicle's transmission being placed in a parking gear. In another instance, detection of a known location, such as the user's home or workplace, may trigger at the vehicle an anticipatory vehicle ignition termination signal. It should be appreciated that an anticipatory vehicle ignition termination signal may be received even though the vehicle ignition does not always terminate after such event; for example, there may be instances where the vehicle is placed in a parking gear without the ignition being subsequently terminated. Furthermore, as used herein termination of the vehicle's ignition refers to terminating operation of the vehicle's main propulsion means, whether it be an internal combustion engine, electric motor, or some other prime mover or hybrid vehicle propulsion. Thus, an anticipatory vehicle ignition termination signal is one that is indicative of the imminent shutdown of a vehicle's main propulsion means.

Once the vehicle receives the anticipatory vehicle ignition termination signal, the vehicle may operate the wireless communications device in a station mode and, subsequently, use the communications device to detect the presence of a wireless access point (WAP). In one scenario, the vehicle's ignition may be terminated during or before this step; however, in such a scenario, the vehicle may maintain power, even with ignition off, as to allow the wireless communications device to detect the presence of a WAP. Upon detection of a WAP, the vehicle may store data, such as a flag, indicating the detected presence of the WAP. The vehicle then establishes a connection with the WAP. The connection to the WAP can be made instantly after detection of the WAP, at a future time and in accordance with instructions from a remote server (e.g., a system module operating schedule), or at both times. After a connection is established, the vehicle may check for an Internet or other remote network connection; if such a connection does not exist, then the vehicle may attempt to establish a connection and check for a remote network connection with another WAP. Upon a successful connection to a WAP with Internet or other remote network connectivity, the vehicle can carry out data communications with one or more remote networks, such as a remote server located at a remote facility. For example, the vehicle can download an OTA update from the remote server and then install the OTA update to the appropriate device or module. It should be appreciated that, in some embodiments, during any of these steps, the vehicle's ignition may be terminated.

Referring now to FIG. 1, there is shown an operating environment that comprises a communications system 10 and that can be used to implement the method disclosed herein. Communications system 10 generally includes a vehicle 12 with a wireless communications device 30, a residence 14, one or more wireless carrier systems 70, a land communications network 76, a computer 78, and a remote facility 80. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 12 with the land network 76 or to connect the wireless carrier system with user equipment (UEs, e.g., which include telematics equipment in vehicle 12). Carrier system 70 can implement any suitable communications technology, including for example GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

The location 14 is depicted as a residential home, however, it should be appreciated that location 14 may be any location that includes a wireless access point (WAP) and a network access device, such as a workplace. Location 14 is shown to include router 16 and non-vehicle wireless access point (WAP) 18. A non-vehicle wireless access point is a wireless access point which is not installed as part of the vehicle electronics or carried by vehicle 12. Router 16 is a network access device and, as shown, may provide network connectivity via land network 76. A network access device is a hardware device that communicates with one or more remote networks using a router and/or a modem. For example, location 14 may include a modem (not shown) that is configured to transfer data between the router and land network 76.

Computers 78 (only one shown) can be some of a number of computers accessible via a private or public network such as the Internet. Each such computer 78 can be used for one or more purposes, such as a web server accessible by the WAP 18. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to the vehicle 12.

Remote facility 80 is designed to provide the vehicle electronics 20 with a number of different system back-end functions. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. A database at the remote facility can store account information such as subscriber authentication information, vehicle identifiers, profile records, behavioral patterns, and other pertinent subscriber information. Data transmissions may also be conducted by wireless systems, such as IEEE 802.11x, GPRS, and the like. Although the illustrated embodiment has been described as it would be used in conjunction with a manned remote facility 80 using a live advisor, it will be appreciated that the remote facility can instead utilize a VRS as an automated advisor or, a combination of the VRS and the live advisor can be used.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes the wireless communications device 30, a body control module (BCM) 40, a GPS module 22, other VSMs 42, and numerous other components and devices. Some or all of the different vehicle electronics may be connected for communication with each other via one or more communication busses, such as bus 44. Communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, such as the wireless communications device 30, body control module 40, audio system 64, and GPS module 22, as will be described in detail below. The vehicle 12 can also include other VSMs 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the wireless communications device 30, and can be programmed to run vehicle system and subsystem diagnostic tests. As examples, one VSM 42 can be an engine control module (ECM) that controls various aspects of engine operation such as fuel ignition and ignition timing and another VSM 42 can be a powertrain control module that regulates operation of one or more components of the vehicle powertrain. One or more VSMs 42 may periodically or occasionally have their software or firmware updated and, in some embodiments, such vehicle updates may be OTA updates that are received from a remote facility 80 via land network 76, router 16, WAP 18, and wireless communications device 30 as will be discussed more below. As is appreciated by those skilled in the art, the above-mentioned VSMs are only examples of some of the modules that may be used in vehicle 12, as numerous others are also possible.

Wireless communications device 30 is capable of communicating data via short range wireless communications (SRWC). As shown in the exemplary embodiment of FIG. 1, wireless communications device 30 includes a wireless access point 32, a processor 34, memory 36, and one or more antennas 38 (only one is shown for illustrative purposes). In many embodiments, the wireless communications device 30 may be specifically configured to carry out the method disclosed herein. In one embodiment, wireless communications device 30 may be a standalone module or, in other embodiments, device 30 may be incorporated or included as a part of one or more other vehicle system modules, such as a body control module, an infotainment module, a telematics module, a head unit, and/or a gateway module. In some embodiments, the device 30 can be implemented as an OEM-installed (embedded) or aftermarket device that is installed in the vehicle.

Wireless communications device 30 can be configured to communicate wirelessly according to one or more wireless protocols, including short range wireless communication (SRWC) such as any of the IEEE 802.11 protocols, WiMAX™, ZigBee™, Wi-Fi Direct™ Bluetooth™, or near field communication (NFC). The wireless access point 32 may include a short range wireless communication chipset that enables one or more of these short range wireless communications, such as WiFi™. The SRWC chipset may allow the device 30 to connect to another SRWC device. As used herein, a short range wireless communications (SRWC) device is a device capable of SRWC. Additionally, in some embodiments, the wireless communications device may contain a cellular chipset thereby allowing the device to communicate via one or more cellular protocols.

In addition to acting as a wireless access point for devices to connect to (e.g., a server mode), wireless communications device 30 may carry out wireless communications with another wireless access point, such as a non-vehicle wireless access point (WAP) 18 at location 14. In such an arrangement, WAP 18 may be connected to a router 16 and provide device 30 a connection to the Internet or other remote network. Device 30 may be set to a station or client mode and, thus, may then carry out wireless communications with WAP 18. As used herein, a client or a station mode is an operating mode of a wireless communications device that enables the device to act as a station or client device thereby allowing the device to scan for and connect to host devices (e.g., wireless access points). More particularly, in the client mode, the client device permits another device (e.g., a server device) to control communication protocols, etc. The WAP 18, acting as a server device, may be set to a wireless access point mode and provide a hotspot for device 30 to connect to when operating in a station mode. A hotspot is an area where a wireless data connection may be established between a wireless device operating in a station or client mode and the device hosting the hotspot via a wireless access point. It should be appreciated that the protocol used in providing a hotspot is not limited to WiFi™ and that any SRWC, such as those listed above, may be used.

The wireless communication device 30 may operate in both a station or client mode and a wireless access point mode at the same time through, for example, use of a dual band antenna. Alternatively or additionally, the wireless communications device 30 may switch between a wireless access point mode and a station mode thereby enabling both modes of operation at the same time. This would enable wireless communications device 30 to communicate concurrently with a first wireless device (e.g., a mobile device or VSM) operating in the wireless access point mode and to communicate with WAP 18 operating in the station mode. This may enable the vehicle to throttle wireless communications between devices at or near the vehicle (e.g., VSMs 42) and remote servers or computers (e.g., remote facility 80, computers 78) through device 30.

Wireless communications device 30 may be in communication with one or more remote networks via packet-switched data communication. This packet-switched data communication may be carried out through use of an non-vehicle wireless access point that is connected to a land network via a router or modem, such as WAP 18 and router 16 described above. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30 via, for example, a telematics unit included in the vehicle. In one embodiment, the communications device 30 may also include a cellular chipset or be communicatively coupled to a device comprising a cellular chipset such as a telematics unit. In either event, communications device 30 may, via a cellular chipset, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 34 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 34 executes various types of digitally-stored instructions, such as software or firmware programs stored in memory 36, which enable the device 30 to provide a wide variety of services. For instance, processor 34 can execute programs or process data to carry out at least a part of the method discussed herein. In one embodiment, device 30 includes an application that enables the method described below in FIG. 2. Memory 36 may include RAM, other temporary powered memory, any non-transitory computer-readable medium (e.g., EEPROM), or any other electronic computer medium that stores some or all of the software needed to carry out the various external device functions discussed herein.

Body control module (BCM) 40 is shown in the exemplary embodiment of FIG. 1 as being electrically coupled to wireless communications device 30 and communication bus 44. In some embodiments, the BCM 40 may be integrated with or part of a center stack module (CSM). Or, the BCM and CSM may be separate devices that are connected to one another via bus 44. BCM 40 may communicate with wireless communications device 30 and/or one or more vehicle system modules, such as GPS 22, audio system 64, or other VSMs 42. BCM may include a processor and memory such that the BCM may direct one or more vehicle operations including, for example, controlling central locking, air conditioning, and power mirrors. BCM 40 may receive data from wireless communications device 30 and, subsequently, send the data to one or more vehicle modules. For example, as will be explained more below, the wireless communications device 30 may receive over-the-air (OTA) updates for one or more vehicle modules. Then, upon receiving such updates, the device 30 may notify and/or send the updates to the BCM 40. BCM 40 may install the updates on the appropriate modules and/or send the updates to the appropriate modules.

Additionally, BCM 40 may receive a notification or indication from wireless communications device 30 that a wireless network connection is available and/or that a wireless network connection has been established with a preferred hotspot or wireless access point, such as WAP 18. As used herein, a preferred wireless access point is a wireless access point that has been designated as preferable by the vehicle or an operator of the vehicle. The vehicle may store identifiers that correspond with preferred wireless access points, such as service set identifiers (SSIDs) or media access control (MAC) addresses. A preferred WAP may be automatically determined by the vehicle based on certain OEM or manufacturer-selected criteria. Or, a preferred wireless access point may be selected through operation of a vehicle user interface by a vehicle operator, such as through use of touchscreen 68 or microphone 66 included in vehicle 12. In another embodiment, an operator may configure his/her preferred wireless access points using computer 78. In either example, the operator may input the SSID or other identifier of WAP 18 or router 16 using one or more of the vehicle user interfaces. The preferred wireless access point(s) may be stored in memory 36 or other suitable memory medium included in vehicle 12. In other embodiments, preferred wireless access points are learned by vehicle 12 based on user preferences or other settings in combination with, for example, GPS coordinates received from GPS 22.

In some embodiments, the BCM or other vehicle system module may operate according to instructions that are received from a remote server or facility, such as computer 78 or facility 80. The instructions may be an operating schedule that includes a set of instructions that instruct the vehicle when certain operations are to be carried out. The schedule may be a stored on a memory medium included in the BCM 40 or other vehicle system module, or may be stored in memory 36 of wireless communications device 30. The schedule may be downloaded or updated based on data downloaded from a remote facility 80 or computer 78. In one embodiment, the schedule comprises a list of updates or other operations that are to be performed by one or more vehicle system modules. Each of the updates or operations may also include a time for which the operation is to be carried out. For example, the BCM 40 may monitor the schedule and set alarms or reminders in accordance with the schedule. When the BCM 40 realizes that an operation is to be performed in response to the triggering of an alarm or reminder, then BCM 40 may provide an indication to one or more vehicle system modules associated with the alarm or reminder. Once the operations associated with the alarm or reminder are completed, the BCM 40 may direct the one or more vehicle system modules to turn off or switch to a low-power or sleep state when the vehicle's ignition is off.

Global position system (GPS) module 22 receives radio signals from a constellation of GPS satellites (not shown). From these signals, the module 22 can determine vehicle position which may enable the vehicle to determine whether it is at a known location, such as home or workplace 14. Moreover, GPS module 22 can provide this location data to wireless communications device 30, which can then use this data to identify known locations, such as a vehicle operator's home or workplace. Additionally, GPS module 22 may be used to provide navigation and other position-related services to the vehicle operator. Navigation information can be presented on the display 68 (or other display within the vehicle) or can be presented verbally such as is done when supplying turn-by-turn navigation. The navigation services can be provided using a dedicated in-vehicle navigation module (which can be part of GPS module 22), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 78, for other purposes, such as fleet management. Also, new or updated map data can be downloaded to the GPS module 22 from the remote facility 80 via a vehicle telematics unit.

Vehicle electronics 20 also includes a number of vehicle user interfaces that provide vehicle occupants with a means of providing and/or receiving information, including microphone 66, pushbutton(s) 62, audio system 64, and visual display 68. As used herein, the term "vehicle user interface" broadly includes any suitable form of electronic device, including both hardware and software components, which is located on the vehicle and enables a vehicle user to communicate with or through a component of the vehicle. Microphone 66 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. The pushbutton(s) 62 allow manual user input into the communication device 30 to provide other data, response, or control input. Audio system 64 provides audio output to a vehicle occupant and can be a dedicated, stand-alone system or part of the primary vehicle audio system. According to the particular embodiment shown here, audio system 64 is operatively coupled to both vehicle bus 44 and an entertainment bus (not shown) and can provide AM, FM and satellite radio, CD, DVD and other multimedia functionality. This functionality can be provided in conjunction with or independent of the infotainment module described above. Visual display or touch screen 68 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Figure 2:
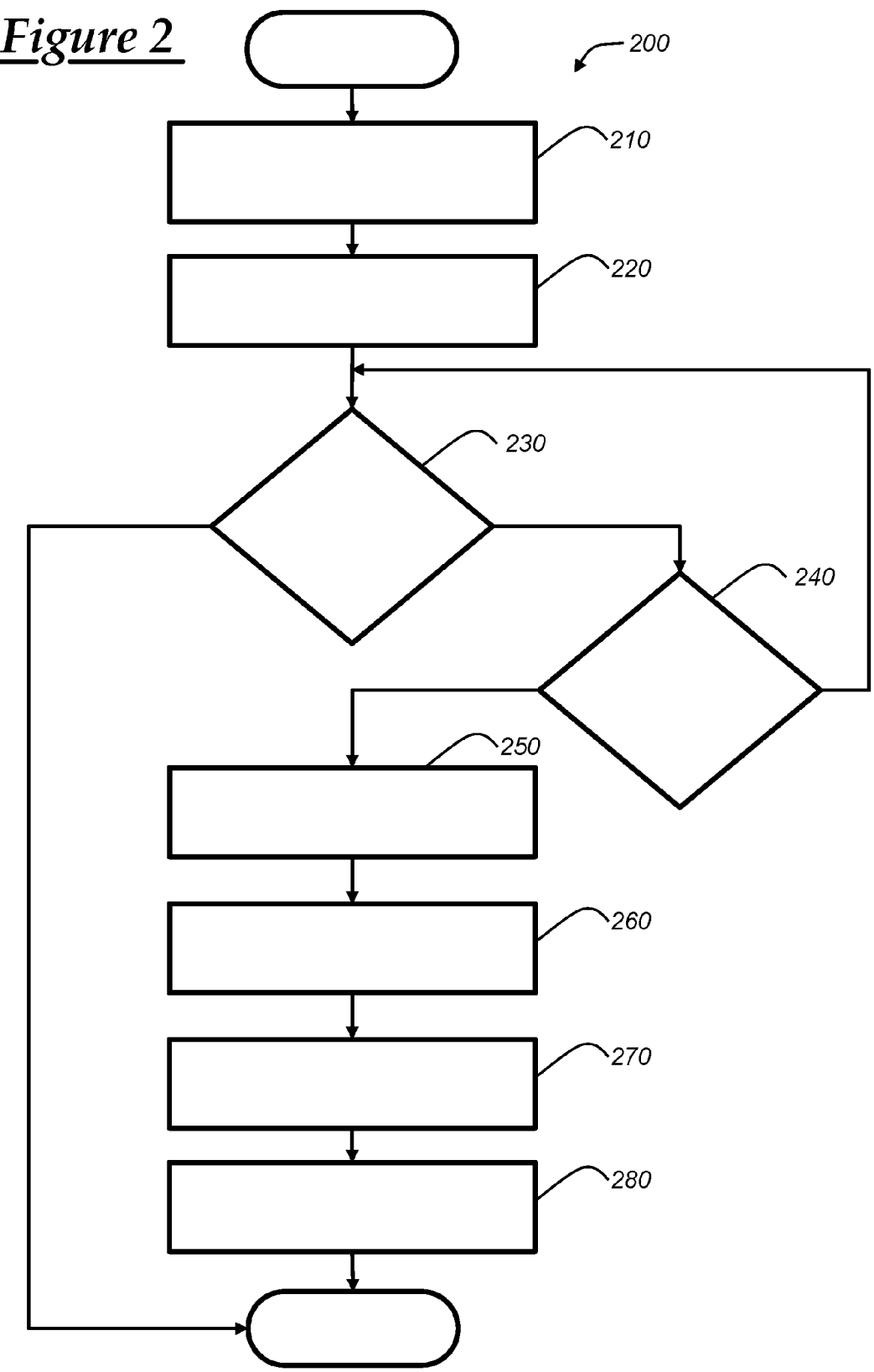
FIG. 2 is a flowchart illustrating a method of carrying out wireless communications at a vehicle.

With reference to FIG. 2, there is shown an embodiment of a method 200 of carrying out wireless communications at a vehicle. The method begins with step 210 wherein an anticipatory vehicle ignition termination signal is received. The generation and/or reception of an anticipatory vehicle ignition termination signal may be predicated on events giving rise to an inference that the vehicle's ignition may soon be terminated. Such events may be a vehicle operator placing the vehicle in a parking gear or may be the realization that the vehicle is at or approaching a known location, such as a home residence 14. Another such event may be the opening of a garage door via a garage door remote.

In one embodiment, the wireless communications device 30 receives the anticipatory vehicle ignition termination signal from a body control module (BCM) 40. In such an embodiment, the BCM 40 may generate the anticipatory ignition termination signal and send the signal directly to device 30 or via communications bus 44. Upon reception of the anticipatory signal, wireless communications device 30 may store the signal or other data in memory 36.

In step 220, the wireless communications device is set to operate in a station mode in response to receiving the anticipatory vehicle ignition termination signal. In another embodiment, the wireless communications device may be set to operate in both a station mode and a wireless access point mode, as described above. Or, alternatively, a wireless distribution system (WDS) may be implemented in connection with wireless communications device 30 and WAP 18 such that wireless access point to wireless access point communications may be carried out without having to switch the device 30 to station mode. In yet another embodiment, the wireless communications device is configured to operate in a peer-to-peer (P2P) mode such that it may communicate with other P2P enabled devices.

In one embodiment, it may be desirable to use the wireless communications device 30 at a later time, which may be, for example, in accordance with an operating schedule. In such an embodiment, it may be desirable to set the wireless communications device 30 to operate in a station mode in anticipation of the vehicle's ignition being terminated. At least in some embodiments, when a vehicle's ignition is terminated, many vehicle electronics are turned off or set to low-powered operating modes and, thus, these electronics may not be able to perform certain operations, such as switching to a station mode, in these low-powered of off modes. For example, in at least one embodiment, the device 30 cannot be switched between modes (or to station mode) while the vehicle ignition is off. Therefore, by anticipating a vehicle ignition termination, the vehicle may carry out certain operations, such as setting device 30 to a station mode, before the vehicle is terminated or at least before the certain devices are powered off or set to low-powered modes. In other embodiments, it may be possible to set the wireless communications device to a station mode while the vehicle ignition is off, but only soon after the ignition has been terminated such that the vehicle still has sufficient power to perform this operation. As those skilled in the art will appreciate, in some embodiments, vehicles may retain certain amounts of electric power immediately after the vehicle's ignition is terminated as to allow certain devices to be properly shutdown or to be set to another operating state, such as a low power or standby mode. Thus, by setting device 30 to operate in a station mode at this time, the device 30 will not later have to be set, which may require the vehicle to power up certain vehicle electronics and/or waste unnecessary power. After the wireless communications device 30 is configured to operate in a station mode, then the method continues to step 230.

In step 230, the wireless communications device determines whether there is a preferred wireless access point or hotspot in range. In one embodiment, device 30 may use Wi-Fi™ communications and, thus, may perform a passive or an active scan for Wi-Fi™ access points. A passive scan generally refers to the instance where the scanning device listens for a beacon signal over a certain frequency or channel (e.g., "channel 1" having a center frequency of 2.412 GHz (see 802.11b/g/n)). A Wi-Fi™ wireless access point generally sends out a beacon frame or signal in accordance with a specific time interval (e.g., every 100 ms a beacon frame is transmitted), which generally contains a header, a body, and a frame check sequence (FCS). The beacon frame can include information about the transmitting device (e.g., supported frequency channels, network information, and device information), metadata (e.g., timestamps), traffic information (e.g., a traffic indication map (TIM)), etc. In one embodiment, device 30 may scan for beacon messages sent out by wireless access points. Then, the vehicle may recall and compare information contained in the beacon signal(s) with stored information, such as SSIDs and/or MAC addresses, pertaining to wireless access points to which the device 30 previously was connected. Thus, the result of this comparison may be used by the vehicle to determine whether a preferred wireless access point is detected.

In one embodiment, a preferred wireless access point may be WAP 18 located at a home residence 14. The device 30 may detect the presence of the preferred wireless access point via comparing the service set identifiers (SSIDs) of all available or in range wireless access points to those SSIDs that are stored in memory 36 and associated with a preferred wireless access point. For example, an operator may input the SSID of his/her home router or WAP into vehicle 12 via microphone 66, touchscreen 68, or other vehicle user interface(s). Alternatively, the vehicle may display a list of presently available wireless access points on visual display 68. A vehicle user may then select one or more of the displayed WAPs as preferred WAPs. Then, upon reaching step 230, the vehicle may recall all inputted SSIDs and then determine if any available WAPs have an SSID that matches any of the recalled SSIDs. In other embodiments, another identifier may be used, such as a media access control (MAC) address.

In yet another embodiment, the presence of a preferred wireless access point may be determined via geolocation means. For example, a vehicle operator may enter information about their residence, such as the address of the residence. Then, upon step 230 being reached, the vehicle may use GPS module 22 to determine the vehicle's present coordinates. Subsequently, the coordinates may then be compared to the inputted residential address. If the distance between the two is less than some predetermined value (e.g., 50 feet), then the wireless communications device may assume the presence of a preferred wireless access point. Of course, any combination of these techniques could be used as well.

In some embodiments, multiple wireless access points may be detected. In this case, the vehicle may use previously stored information, such as information in memory 36, to determine which preferred access point to use for data communications (see steps 270 and 280). Or, the vehicle may select a WAP based on certain performance criteria, such as signal strength, bitrates, latency (e.g., which may be determined via "ping" or similar operation), bandwidth, etc. Additionally, or alternatively, a WAP may be selected based on other criteria that may be included in the WAP's beacon signals, stored in memory of the vehicle, etc.

In some embodiments, a preferred wireless access point may not be detected. In these embodiments, the vehicle may determine if a connection with such WAPs is desirable and/or possible and, if so, may choose to connect to these WAPs. Information relating to the detection of the wireless access points may then be stored in memory 36 or sent to one or more other modules, such as BCM 40. Additionally, the vehicle or operator may choose to set the selected WAP as a preferred WAP. If so, then the vehicle may store information related to the WAP, such as an SSID or MAC address, in memory. In the illustrated embodiment, if a preferred wireless access point is detected, then the method continues to step 240; otherwise, the method ends. In other embodiments, the method may continue to step 240 if any WAP, not necessarily a preferred WAP, is detected.

In step 240, the wireless communications device 30 determines if the preferred wireless access point has data connectivity such that data access to one or more remote networks is available via the preferred wireless access point. This step may be carried out immediately after the preferred wireless access point is detected, at the time the vehicle desires to establish a wireless connection with the preferred WAP, or both. To determine whether the preferred WAP has data connectivity may require that the wireless communications device 30 first establishes a connection with the preferred WAP. In this case, the device 30 will establish a connection with the WAP 18.

The wireless communications device may determine the remote data connectivity of the preferred wireless access point through querying the wireless access point. Or, the communications device 30 may determine the data connectivity via an attempt to connect to a remote network—e.g., using "ping" or a similar operation. In another embodiment, the device 30 may determine the remote data connectivity of WAP 18 via inspecting one or more wireless signals transmitted by WAP 18, such as a beacon frame or signal. If the wireless communications device determines that there is no data connectivity, then the method may proceed back to step 230 to check for other available preferred wireless access points or, if there are no other preferred wireless access points, the method may end. Otherwise, if there is remote data connectivity at the detected preferred wireless access point, then the method 200 continues to step 250. In some embodiments, if there is no present need for a connection to the WAP 18, the device 30 may disconnect from WAP 18. If there is a present need for the connection to the WAP 18, then the device 30 may keep its connection with WAP 18 alive and may not need to reestablish a connection (see step 270).

In step 250, the wireless communications device notifies at least one of the plurality of vehicle system modules of the presence of the preferred wireless access point. The wireless communications device 30 may generate a notification signal or recall a signal from memory 36 and, subsequently, send the notification signal to one or more system modules, such as body control module (BCM) 40. The vehicle system module that receives the notification may then store such a notification or other message based on the notification in a memory of vehicle electronics 20.

In one embodiment, BCM 40 receives a notification from the wireless communications device 30. The notification may indicate that a preferred wireless access point has been detected. Alternatively, the notification may comprise information pertaining to the detected wireless access point, such as, for example, the SSID of the access point or hotspot. The BCM 40 may then store the information in a memory device and/or perform other operations, such as forwarding the notification or other message(s) based thereon to one or more VSMs. The method 200 then proceeds to step 260.

In step 260, one or more vehicle system module(s) are woken up or turned on in response to the notification. As used herein, the term "woken up" or its similar forms, when used with reference to a module or device, means that the module or device is switched from an off state, a sleep state, or a low-power state to an "on" state, normal-functioning state, or other state that allows for the download of data and/or installation of electronic instructions.

In one embodiment, the BCM 40 may comprise a memory device with an operating schedule stored therein. The operating schedule may, for example, comprise a schedule of updates for one or more vehicle modules. In one example, the operating schedule may comprise a time, a resource identifier or locator, and a vehicle system module identifier for each of the vehicle system module updates. The operating schedule may be downloaded from a remote facility 80 or computer 78 via cellular network 70 or WAP 18 and router 16. Thus, when the BCM recognizes that the current time is the same or within a predetermined amount of one or more times in the operating schedule, the BCM 40 may then send an alarm or wake-up signal to the corresponding vehicle module. Put differently, when the current time matches (or differs only by a predetermined amount or less compared to) one of the times stored in the operating schedule, then the BCM will send an alarm, wake-up signal, or notification to the vehicle system module of the vehicle that corresponds with the vehicle system module identifier as indicated in the operating schedule. It should be appreciated that, at least in some embodiments, the vehicle ignition is off at this time.

In another embodiment, when the BCM 40 receives the notification in step 250, the BCM 40 may then notify each, or provide an indication to each, of the vehicle system modules that may desire a data connection to a remote network, such as computer 78 or remote facility 80. In one instance, it may be desirable for a VSM 42 to receive an over-the-air (OTA) update from a remote facility 80. In another instance, it may be desirable for a VSM 42 to send transactional information to a remote facility 80 via the WAP 18 and router 16. In either of these cases, the BCM 40 may send a notification to these VSMs 42.

In yet another embodiment, an event at vehicle electronics 20 may trigger the BCM 40 to wake up so that it may connect to a remote network via the preferred WAP. For example, the BCM may realize that a vehicle system module needs to connect to a remote facility. This event would then trigger the BCM 40 to wake up the vehicle system module. The method 200 then continues to step 270.

In step 270, the wireless communications device establishes a wireless connection with the preferred wireless access point if there is not already a connection established (see step 240). In one embodiment, IEEE 802.11b/g/n may be used to establish a Wi-Fi™ connection to the WAP 18. In another embodiment, the wireless communications device 30 may use other SRWC, such as Bluetooth™ or Bluetooth Low Energy™. It should be appreciated that steps 260 and 270 may be carried out in a different order or may be carried out concurrently. After a wireless connection is established between the wireless communications device and the preferred wireless access point, the method continues to step 280.

In step 280, the wireless communications device is used to communicate data between the preferred wireless access point 18 and one or more vehicle system modules via the established wireless connection. Data may be sent by the wireless communications device 30 to the preferred wireless access point 18 and/or data may be received by the wireless communications device 30 from the WAP 18.

In one embodiment, the wireless communications device 30 receives data comprising an over-the-air (OTA) update from the WAP 18. The OTA update may comprise software or firmware that is to be installed on one or more vehicle system modules. For example, the OTA update may be a firmware update for a VSM 42. Here, the OTA update may be downloaded to BCM 40 from a remote server at remote facility 80. Then, the BCM 40 may perform an installation operation or a vehicle system update procedure on the VSM 42 such that the firmware update is installed on the VSM 42. The vehicle system update procedure may comprise installing at least one vehicle update. A vehicle update may include data, instructions, software, and/or firmware that is to be installed to a vehicle system module. In another embodiment, the OTA update is downloaded to a VSM 42 and the VSM 42 itself performs the installation operation. In another example, the OTA update is to be installed on the BCM 40, the wireless communications device 30, the GPS module 22, and/or other vehicle modules that may be part of vehicle electronics 20.

In some embodiments, after the wireless communications device is finished communicating data with the preferred WAP via the established wireless connection, one or more VSMs may be turned off or set to a different operating state, such as a sleep state or a low-power state. The method 200 then ends.

Thus, there has been described an embodiment of a method of carrying out wireless communications at a vehicle. The method includes receiving an anticipatory vehicle ignition termination signal, wherein the anticipatory vehicle ignition termination signal indicates that an event associated with termination of a vehicle's ignition has occurred. Further, the method includes setting the wireless communications device to operate in a station mode in response to receiving the anticipatory vehicle ignition termination signal and using the wireless communications device in the station mode to detect a presence of a wireless access point. After a presence of a wireless access point is detected, the wireless communications device then provides a signal to at least one of the vehicle system modules of the presence of the wireless access point and establishes a wireless connection between the wireless communications device and the wireless access point. After a connection is established, data is communicated using the wireless communications device between the wireless access point and one or more vehicle system modules via the established wireless connection. In some embodiments, the vehicle ignition may switch to off during any one of the previous steps. At least in some embodiments, the method enables the setting of a wireless communications device to a station mode before certain vehicle electronics, including the wireless communications device, are shut down or set to a low power mode as a result of termination of the vehicle's ignition. After switching to station mode, the wireless communications device may determine the presence of a preferred wireless access point that may be used by certain vehicle system modules later and while the vehicle's ignition is terminated.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive or. Put differently, the phrase "A, B, and/or C" includes: "A"; "B"; "C"; "A and B"; "A and C"; "B and C"; and "A, B, and C."

The invention claimed is:

1. A method of carrying out wireless communications at a vehicle, wherein the vehicle comprises a wireless communications device and a plurality of vehicle system modules, and wherein the method comprises the steps of:
receiving an anticipatory vehicle ignition termination signal, wherein the anticipatory vehicle ignition termination signal indicates that an event associated with termination of a vehicle's ignition has occurred;
setting the wireless communications device to operate in a station mode in response to receiving the anticipatory vehicle ignition termination signal;
detecting the presence of a wireless access point using the wireless communications device in the station mode;
providing an indication to at least one of the vehicle system modules of the presence of the wireless access point, wherein the at least one vehicle system module that is provided with the indication is a body control module;
establishing a wireless connection between the wireless communications device and the wireless access point; and
communicating data between the wireless access point and one or more vehicle system modules via the established wireless connection using the wireless communications device, wherein the body control module sends a wake up signal to one or more of the plurality of vehicle system modules, wherein the wake up signal directs or triggers the one or more vehicle system modules to turn on, power on, or switch to an operating state that allows for the communication of data with the body control module or the wireless communications device while the vehicle ignition is off.

2. The method of claim 1, wherein the wireless access point is a preferred access point.

3. The method of claim 1, wherein the event associated with termination of the vehicle's ignition occurs before the vehicle's ignition is terminated.

4. The method of claim 3, wherein the event comprises placing the vehicle's transmission into a parking gear.

5. The method of claim 1, wherein the establishing and communicating steps are carried out in accordance with an operating schedule.

6. The method of claim 5, wherein the operating schedule comprises a set of times and corresponding vehicle system module indicators, wherein the times indicate when the establishing and communicating steps are to be carried out, and wherein the vehicle system module indicators indicate the at least one vehicle system module.

7. The method of claim 1, wherein the body control module, in response to the providing step, stores data indicating the presence of the wireless access point.

8. The method of claim 1, wherein the communicated data is an over-the-air (OTA) update, and wherein the wireless communications device downloads the OTA update from a remote network to the one or more vehicle system modules.

9. The method of claim 8, further comprising the step of installing the OTA update to one or more of the vehicle system modules, wherein the OTA update is a software or firmware update for the one or more vehicle system modules.

10. A method of carrying out wireless communications at a vehicle, wherein the vehicle comprises a wireless communications device and a plurality of vehicle system modules, and wherein the method comprises the steps of:
receiving an anticipatory termination signal at the wireless communications device or at least one of the vehicle system modules;
determining at the wireless communications device the availability of a short-range wireless communication (SRWC) connection between the wireless communications device and a wireless access point;
based on the receiving and determining steps, providing an indication to a predetermined vehicle system module in the vehicle to initiate a vehicle system update procedure when an ignition of the vehicle has been terminated, wherein the predetermined vehicle system module is a body control module (BCM);
setting an alarm associated with a first vehicle system module in response to the BCM receiving the indication, wherein the alarm will be triggered at a future point in time; and
subsequently, when the ignition of the vehicle is terminated and using the SRWC connection between the wireless communications device and the wireless access point, performing the vehicle system update procedure by installing at least one vehicle update to one or more of the plurality of vehicle system modules.

11. The method of claim 10, wherein the wireless communications device is switchable between a wireless access point mode and a station mode, and further comprising the step of setting the wireless communications device to operate in the station mode before the ignition of the vehicle is terminated and in response to receiving the trigger signal.

12. The method of claim 10, further comprising the step of exiting a sleep state, a low-powered state, or an off state at the first vehicle system module in response to the triggering of the alarm.

13. The method of claim 12, wherein the initiation of the vehicle system update procedure occurs in response to the exiting step and when the ignition of the vehicle is terminated.

14. The method of claim 10, wherein the availability determination further comprises: determining that the wireless access point is connected to a remote server associated with vehicle backend services, wherein vehicle backend services include transmitting vehicle updates to the vehicle.

15. The method of claim 14, wherein the wireless access point is associated with a home address or work address of a user of the vehicle.

16. A vehicle communication system, comprising:
a body control module;
a wireless communications device, comprising:
  a short range wireless communications chipset; and
  a processor, wherein the processor is electronically coupled to the short range wireless communications chipset and the body control module, such that data may be communicated between the wireless communications device and a short range wireless communications (SRWC) device through the short range wireless communications chipset, wherein the SRWC device provides a hotspot enabling wireless data connections;
wherein the body control module is configured to perform the following:
  anticipate a vehicle ignition termination;
  in response to anticipating the vehicle ignition termination, direct the wireless communications device to operate in a station mode; and
  when the wireless communications device detects the hotspot and the presence of data connectivity, send a wake up signal to one or more vehicle system modules, wherein the wake up signal directs or triggers one or more vehicle system modules to turn on, power on, or switch to an operating state that allows for communication of data with the body control module or the wireless communications device while the vehicle ignition is off and, subsequently, carry out data communications over the hotspot via the SRWC device.

* * * * *